United States Patent
Hsieh et al.

(10) Patent No.: US 8,549,057 B1
(45) Date of Patent: Oct. 1, 2013

(54) SIGNAL LEVEL CONTROL

(75) Inventors: Cheng Hsiang Hsieh, Los Gatos, CA (US); Paul-Hugo Lamarche, San Jose, CA (US); Arif Akram Siddiqi, Santa Clara, CA (US)

(73) Assignee: Xilinx, Inc., San Jose, CA (US)

( * ) Notice: Subject to any disclaimer, the term of this patent is extended or adjusted under 35 U.S.C. 154(b) by 522 days.

(21) Appl. No.: 12/897,671

(22) Filed: Oct. 4, 2010

(51) Int. Cl.
*G06F 17/10* (2006.01)
*H03H 7/30* (2006.01)

(52) U.S. Cl.
USPC ............................ 708/319; 708/322; 375/232

(58) Field of Classification Search
USPC .................. 708/319, 322, 323; 375/232, 233
See application file for complete search history.

(56) References Cited

U.S. PATENT DOCUMENTS

| | | | | |
|---|---|---|---|---|
| 2008/0192860 | A1* | 8/2008 | Harwood et al. | 375/296 |
| 2010/0329309 | A1* | 12/2010 | Tsui et al. | 375/130 |
| 2011/0158087 | A1* | 6/2011 | Chengson et al. | 370/225 |

* cited by examiner

*Primary Examiner* — Chuong D Ngo
(74) *Attorney, Agent, or Firm* — W. Eric Webostad

(57) ABSTRACT

An embodiment of a method for control of signal level is disclosed. In such an embodiment, a number for a pre-cursor set, a number for a cursor set, and a number for a post-cursor set are set corresponding to a weighted contribution of a pre-cursor symbol, a weighted contribution of a cursor symbol, and a weighted contribution of a post-cursor symbol, respectively, for the signal level. A number associated with a high-impedance set is determined. The number associated with the high-impedance set is determined by subtracting the number for the pre-cursor set, the number for the cursor set, and the number for the post-cursor set from a total available amount of units. The high-impedance set provides no weighted contribution to the signal level. Data is transmitted using the signal level set responsive to the pre-cursor set, the cursor set, and the post-cursor set.

14 Claims, 9 Drawing Sheets

US 8,549,057 B1

SIGNAL LEVEL CONTROL

FIELD OF THE INVENTION

An embodiment relates to integrated circuit devices ("ICs"). More particularly, the embodiment relates to signal level control for an IC.

BACKGROUND OF THE INVENTION

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Coefficients of a Finite Impulse Response ("FIR") filter are used to set signal level for coupling to a transmission media. For differential signaling with positive and negative versions of a signal, a negative symbol is sent with an associated positive symbol. Conventionally, the negative symbol is not as strong as the positive signal.

Symbols prior to and following a symbol that is transmitted may have an effect on the symbol being transmitted. To account for such effects, weighted contribution to symbols may be preconditioned given prior knowledge of a signal to be transmitted. This preconditioning may be performed by an FIR filter by setting contribution of symbols transmitted before and after a current symbol, as well as contribution of such current or main symbol, to provide a signal level.

However, different transmission specifications, such as Peripheral Component Interconnect Express ("PCIe") and IEEE802.3ap or 10Gbase-KR for example, have differences in signal level setting capabilities. Accordingly, it would be desirable and useful to provide bi-modal signal level control.

SUMMARY OF THE INVENTION

One or more embodiments generally relate to signal level control for an IC.

An embodiment relates generally to a method for control of signal level. In such an embodiment, a number for a pre-cursor set, a number for a cursor set, and a number for a post-cursor set are set corresponding to a weighted contribution of a pre-cursor symbol, a weighted contribution of a cursor symbol, and a weighted contribution of a post-cursor symbol, respectively, for the signal level. A number associated with a high-impedance set is determined. The number associated with the high-impedance set is determined by subtracting the number for the pre-cursor set, the number for the cursor set, and the number for the post-cursor set from a total available amount of units. The high-impedance set provides no weighted contribution to the signal level. Data is transmitted using the signal level set responsive to the pre-cursor set, the cursor set, and the post-cursor set.

Another embodiment relates generally to a method for bi-modal operation. In such an embodiment, a selection as between a first mode and a second mode is made. Responsive to selection of the first mode, a pre-cursor unit number for a pre-cursor range and a post-cursor unit number for a post-cursor range are set. In the first mode, a cursor range is defined that varies responsive to the pre-cursor unit number and the post-cursor unit number, and a cursor unit number for the cursor range is set. In the first mode, a high-impedance unit number is determined by subtracting the pre-cursor unit number, the cursor unit number, and the post-cursor unit number from a total available amount of units.

Yet another embodiment relates generally to a system for driving signaling. In such an embodiment, first select circuits are coupled to receive a pre-cursor input and a main cursor input for output selection responsive to first select signals, and second select circuits are coupled to receive a post-cursor input and the main cursor input for output selection responsive to second select signals. Driver circuitry is coupled to receive outputs from the first select circuits and the second select circuits, as well as third select signals and the main cursor input. The driver circuitry is configured to provide a weighted contribution for each of a pre-cursor symbol, a cursor symbol, and a post-cursor symbol for signal level.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments. It should be apparent, however, to one skilled in the art, that one or more embodiments may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
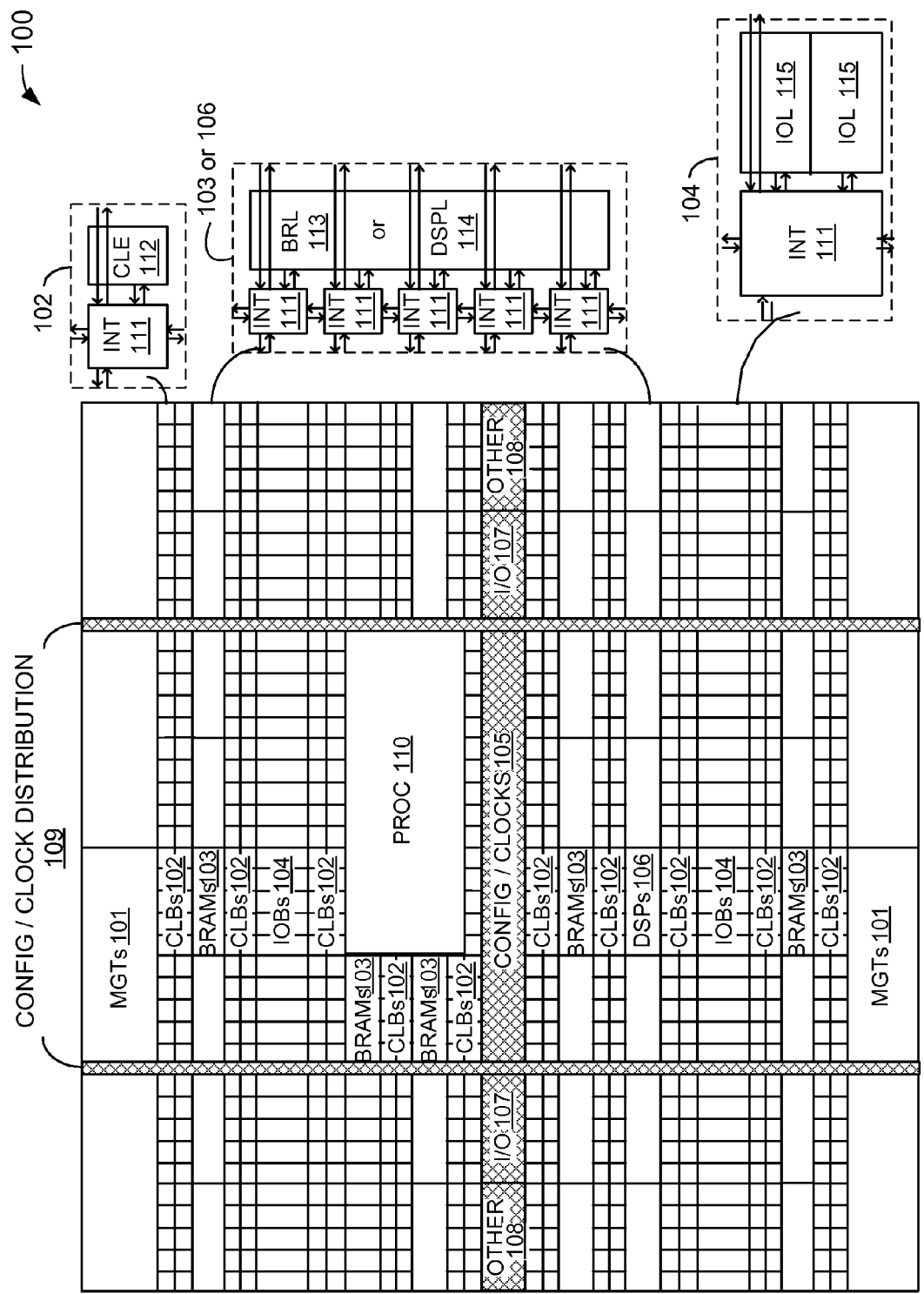
FIG. 1 is a simplified block diagram depicting an exemplary embodiment of a columnar Field Programmable Gate Array ("FPGA") architecture in which one or more embodiments may be implemented.

As noted above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a horizontal area near the center of the die (shown in FIG. 1) is used for configuration, clock, and other control logic. Vertical columns 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Different signaling specifications may have different parameters. In particular, full signal strength may be divided up among a number of units, and thus there may be a total number of units available as associated with full signal strength. Furthermore, there may be different coefficients specified, and thus there may be different coefficient granularity called for in different specifications. For example, for third generation PCIe, coefficient resolution is specified to be between $1/24$ and $1/63$ the full signal strength available. However, full signal strength does not have to be limited from 24 to 63 units; rather, application of units are to be limited to this ratio range. Thus, for example, it is possible to have more than 63 units for full signal strength, where contributions of units are parsed for compliance. For purposes of clarity by way of example and not limitation, it shall be assumed that full signal strength is 80 units of 80 total units available. However, it should be understood that fewer than 80 units of 80 total units available may be used for "full" signal strength in an application. Furthermore, in other embodiments, the total units available may be less than or greater than 80.

FIR filter coefficients associated with each of pre-cursor, main cursor, and post-cursor attributes to associated symbols determines a weighted contribution of each for determining signal level. Thus, pre-cursor, main cursor, and post-cursor settings may be used to weight symbols both before and after a current symbol, as well as weighting the current symbol itself.

Figures 2, 3:
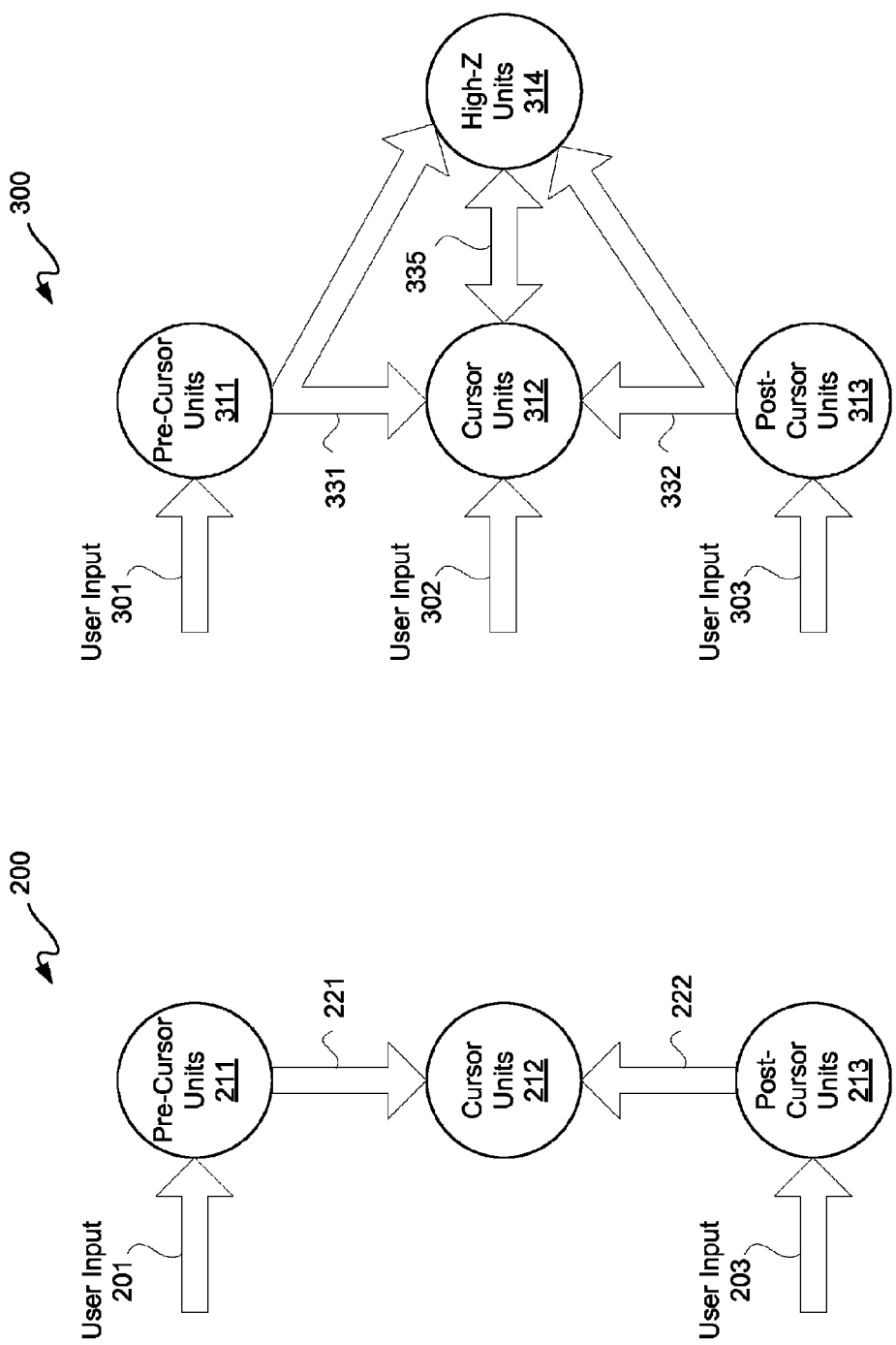
FIG. 2 is a flow diagram depicting an exemplary embodiment of a coefficient setting flow.
FIG. 3 is a flow diagram depicting an exemplary embodiment of coefficient setting flow.

FIG. 2 is a flow diagram depicting an exemplary embodiment of a coefficient setting flow 200. Coefficient setting flow 200 may be for a Peripheral Component Interconnect Express ("PCIe") configuration.

User input 201 sets a number A of pre-cursor units 211 for a pre-cursor set. User input 203 sets a number C of post-cursor units 213 for a post-cursor set. Cursor units 212 have a minimum fixed number. The minimum fixed number of cursor units 212 may be supplemented by unassigned pre-cursor units 221 and/or unassigned post-cursor units 222 for use as cursor units 212. This total number of cursor units is variable B.

For a PCIe embodiment of coefficient setting flow 200, the maximum number of pre-cursor units 211 is 20; the maximum number of post-cursor units 213 is 31; and the fixed minimum number of cursor units is 29. Accordingly, if the maximum number of pre-cursor units and post-cursor units are added with the fixed minimum number of cursor units, a total of 80 units are available. Thus, a signal level is effectively chopped up into 80 possible pieces, where FIR filter coefficients indicate how many of those units are used for each weighted contribution, namely for pre-cursor, main or current cursor, and post-cursor weighted contributions to a corresponding pre-symbol, current symbol, and post-symbol to be transmitted.

Thus, for purposes of clarity by way of example and not limitation, suppose user input 201 for assignment of pre-cursor units 211, which may be any number from 0 to 20, inclusive, is set to a value A. If the value or number is the maximum number of pre-cursors units, namely 20 pre-cursor units, then there are no unassigned or unallocated pre-cursor units 221 that may be used as cursor units 212. However, if user input 201 assigns 8 pre-cursor units 211, then 12 unassigned pre-cursor units 221 are used as cursor units 212. It should be understood that there are no partial units, in other words, the step size of user input is equal to one. Furthermore, for this exemplary embodiment, a 5-bit wide, namely <4:0>, signal may be used for user input 201. It should be understood that a 5-bit signal may be used to cover a range from 0 to 31; however, as described herein the signal strength for pre-cursor units is capped at 20. In an embodiment, user input in excess of 20 may be overwritten by hardware appropriately configured to cap such user input at 20. It should be understood that a specification may constrain pre-cursor, main cursor, and/or post-cursor signal strength. For example, for third generation PCIe, pre-cursor signal strength is constrained to a range from 0 to ¼ of the full signal strength. Thus, for the example of 80 total units available, from 0 to at most 20 units may be used as pre-cursor units to comply with such a PCIe specification.

For a PCIe embodiment, user input 203 may be from 0 to 31, inclusive, with a step size of 1. Thus, 31 of 80 total units available may be used for compliance for example with a third generation PCIe specification. Thus, a 5-bit wide, namely <4:0>, signal may be used for user input 203. For purposes of clarity by way of example and not limitation, if user input 203 was 31, then there would be no unassigned post-cursor units 222 to be used as cursor units 212. If for example, user input 203 was 0, then for a PCIe embodiment 31 unassigned post-cursor units 222 would be used as cursor units 212.

Accordingly, it should be appreciated that in a PCIe mode there are 80 units used for setting signal level, namely all available units are used for setting signal level. Furthermore, it should be understood that a user only has direct control over assigning the number A of pre-cursor and C of post-cursor units, with indirect control of assigning the number of cursor units, which may be in excess of a fixed minimum value therefor, which in a PCIe mode is 29. This number B of cursor units for the above exemplary embodiment may then be obtained by the equation: $B=80-A-C$. In the exemplary embodiment of FIG. 2, by capping post-cursor units 213 and pre-cursor units 211 to 31 and 20, respectively, user input may be overridden such that the minimum number of main cursor units 212 is 29. However, in another embodiment, the number of main cursor units may be 0 when the maximum values of A and B total the total number of available units.

In contrast to coefficient setting flow 200 which only has direct user settings for pre-cursor and post-cursor units with some ability to indirectly affect the number of cursor units, other specifications, such as IEEE 802.3ap and 10 Gigabit Ethernet ("10Gbase-KR") for example, allow more control over coefficient settings. For reasons of clarity, it shall be assumed that IEEE 802.3ap and 10Gbase-KR are interchangeable, and thus only 10Gbase-KR is described below in additional detail.

FIG. 3 is a flow diagram depicting an exemplary embodiment of coefficient setting flow 300. For purposes of clarity by way of example and not limitation, coefficient setting flow 300 is described for supporting both PCIe and 10Gbase-KR. Even though PCIe and 10Gbase-KR modes are described herein, it should be understood that modes like these modes may likewise be used.

User input 301 is for assigning pre-cursor units 311. User input 302 is for assigning cursor units 312. User input 303 is for assigning post-cursor units 313.

For both PCIe and 10Gbase-KR modes, pre-cursor units 311 have a range of 0 to 20, inclusive, with step of 1. In both of such modes, user input 301 may be used to set a number A of pre-cursor units 311 for a pre-cursor set, and unassigned pre-cursor units 331 may be used as cursor units 312 in one embodiment, or either as cursor units 312 or High-Z units 314 in an another embodiment. Unused units are identified as tri-stated or high-impedance ("High-Z") units 314.

User input 303 for a PCIe mode may be the same as user input 203, as previously described. Furthermore, user input 303 for a 10Gbase-KR mode may be the same as user input 203, as previously described, for a PCIe mode. Thus, user input 303 may range from 0 to 31, inclusive, with a step size of 1 in both of such modes. In both of such modes, user input 303 may be used to set a number C of post-cursor units 313, and any unassigned post-cursor units 332 may be used as cursor units 312 in one embodiment, or either as cursor units 312 or High-Z units 314 in an another embodiment.

User inputs 301, 302, and 303 generally represent a determined amount of active pre-cursor, main cursor, and post-cursor units, respectively. User input 301 determines how many pre-cursor units are active, namely a number A of pre-cursor units. User input 303 determines how many post-cursor units are active, namely a number C of post-cursor units. User input 302 determines how many main cursor units that are active, namely a number B of main cursor units. For a PCIe mode, B is equal to the total available units less A and C, namely $B=80-A-C$. If a PCIe mode is selected, user input 302 is automatically fixed at set equal to B, where $B=80-A-C$ for the exemplary embodiment.

However, for a 10Gbase-KR mode, user input 302 is used to directly assign cursor units 312. Generally, for the exemplary embodiment of a 10Gbase-KR mode, user input 302 may be thought of as the number B of cursor units out of 80 total available units, namely from 0 to 80, inclusive, with a step size of 1. It should be understood that in either mode, the sum of the number A of pre-cursor units, the number B of cursor units, and the number C of post-cursor units cannot exceed 80 total available units. The maximum value of a range for B is then a total number of available units less the actual inputs A and C of user inputs 301 and 303. For a 10Gbase-KR mode, such maximum value for a range for B may be mathematically described as $80-A-C \geq B$. In the above-described exemplary embodiment, B may be capped, such as by hardware, so that the maximum value for B is 80-A-C. It should be appreciated that for a 10Gbase-KR mode, user input 302 may be a 7-bit wide signal, namely <6:0>.

For the exemplary embodiment for a 10Gbase-KR mode, the minimum value of user input 302 is the sum of the number of unassigned pre-cursor units 311 that are used as cursor units 312, namely for this example 20 minus A, and the number of unassigned post-cursor units 313 that are used as cursor units 312, namely for this example 31 minus C. The minimum value for a range of B may be mathematically described as 51−A−C≤B. In the above-described exemplary embodiment, B may be capped, such as by hardware, so that the minimum value for B is 51-A-C. In an another embodiment, where unassigned pre-cursor units 311 and post-cursor units 313 may be used as High-Z units 314, the minimum value for a range of B becomes 0. Again, it should be understood that values other than 80, 20, 29, and 31, as described herein, may be used.

In a 10Gbase-KR mode, in contrast to PCIe mode, not all possible units need be used each time. Thus, where a PCIe mode has a fixed number of units, namely 80, that are used for each signal level, the number of units used for signal level in a 10Gbase-KR mode may be as high as 80, but may be less than 80, as described below in additional detail.

The number of High-Z units 314 is the total number of units less the actual assigned values for user inputs 301 through 303. Continuing the above example, for High-Z units 314 set to a value of Z, the number Z may be mathematically expressed as the total number of available units less the actual inputs from user inputs 301 through 303, which may be mathematically expressed as Z=80−A−B−C for a 10Gbase-KR mode.

In an embodiment, hardware may be configured to determine Z for High-Z units 314 responsive to values input for user inputs 301 through 303. Thus, the number of cursor units 312 may be reduced from 29, namely 29−Z, and the result of such subtraction is effectively the number of cursor units assigned and assignable by a user, which may or may not be user input 302.

For example, if both A and C equal 0, then it is possible that B would be set to equal 80. If, however, B was actually set at 50 by user input 302, then the number of High-Z units 314 may exceed a maximum value therefor, if such a maximum value exists. For the exemplary embodiment, the maximum number of High-Z units for a 10Gbase-KR mode is 29. In another embodiment, the maximum number of High-Z units may be 80. Likewise, if user inputs 301 through 303 exceeded the value of 80, namely the maximum number of units available, then the number of High-Z units would be determined to be less than 0. If the number of High-Z units is determined to be less than 0, then the value Z may be overwritten to the value of 0, such as by hardware. Furthermore, if the value of Z is determined to be greater than 29, then the value of Z may be overwritten to equal 29, such as by hardware. In other words, the number of High-Z units 314 is in a range of 0 to 29, inclusive, with a step size of 1, which corresponds to a constraint on cursor units 312. However, it should be understood that the constraint on cursor units 312 effectively varies responsive to values input from user inputs 301 and 303.

Figure 4A:
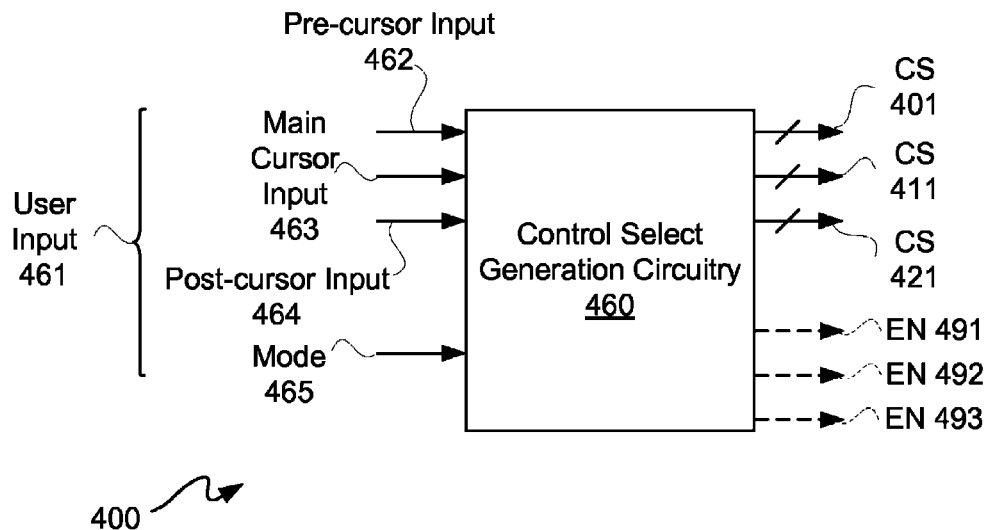
FIGS. 4A through 4C are block/circuit diagrams depicting an exemplary embodiment of a driver system.
Figure 4B:
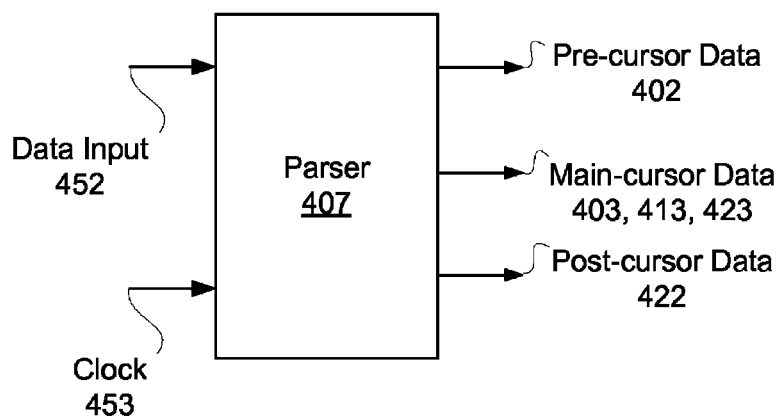
Figure 4C:
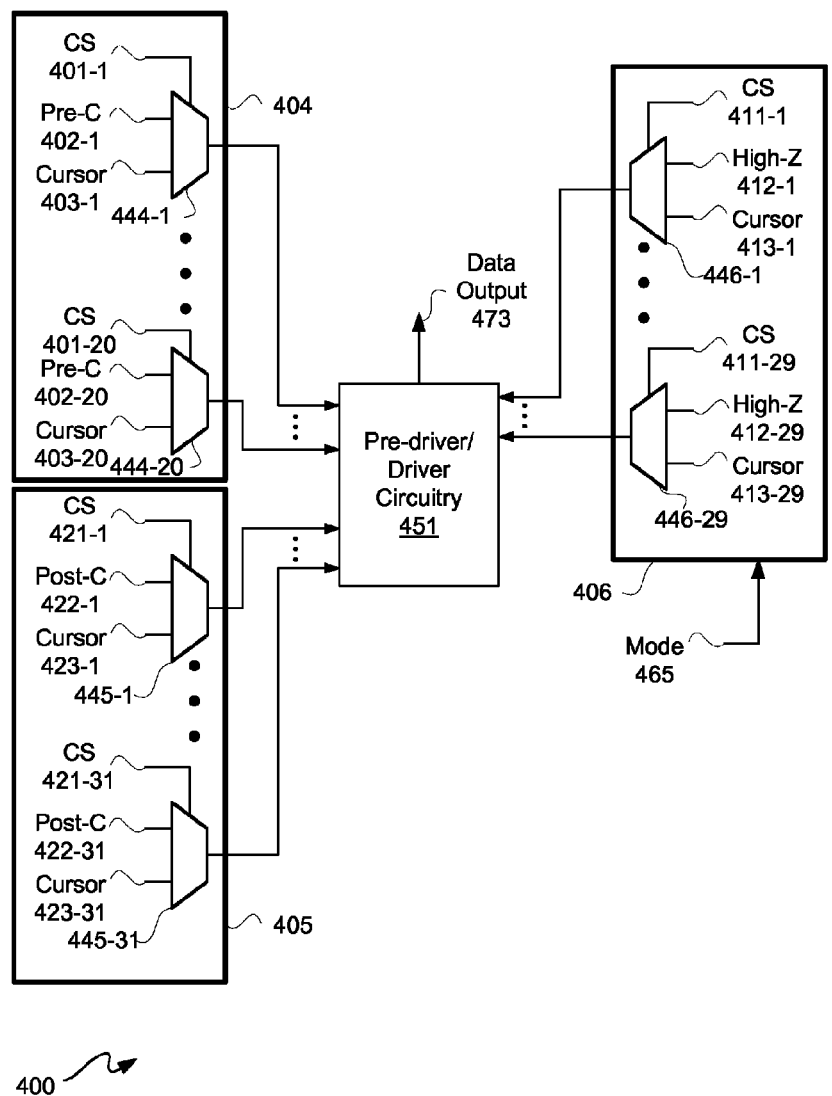

FIGS. 4A through 4C are block/circuit diagrams depicting an exemplary embodiment of a driver system 400. Driver system 400 may be used as a driver to drive outputs from an IC or as a pre-driver to drive inputs to a filter. System 400 is described with simultaneous reference to FIGS. 4A through 4C.

User input 461 is provided to control select generation circuitry 460. User input 461 may include pre-cursor input 462, main cursor input 463, and post-cursor input 464. Additionally, user input 461 may include a mode select input 465 for selecting for example between two modes, such as for example between a PCIe mode and a 10Gbase-KR mode. Output of control select generation circuitry 460 in response to user input 461 may include control select ("CS") sets of signals, such as CS sets of signals 401, 411, and 421, and may optionally or alternatively include enable ("EN') sets of signals 491 through 493. Enable or activation sets of signals 491 through 493 may correspond to pre-cursor, main cursor, and post-cursor.

Data input ("e.g., x[n]") 452 may be input to a data separator or parser 407. Parser 407 may further receive a clock signal 453. Parser 407 may be used to parse data input 452 into pre-cursor data 402, main cursor data 403, 413, and 423, and post-cursor data 422.

Select circuitry 404, 405, and 406 may be used for receiving CS sets of signals 401, 411, and 421, respectively. Select circuitry 404 is associated with pre-cursor data 402 and main cursor data 403. Select circuitry 405 is associated with main cursor data 423 and post-cursor data 422. Select circuitry 406 is associated with main cursor data 413 and with a logic state associated with High-Z states 412.

Figure 4D:
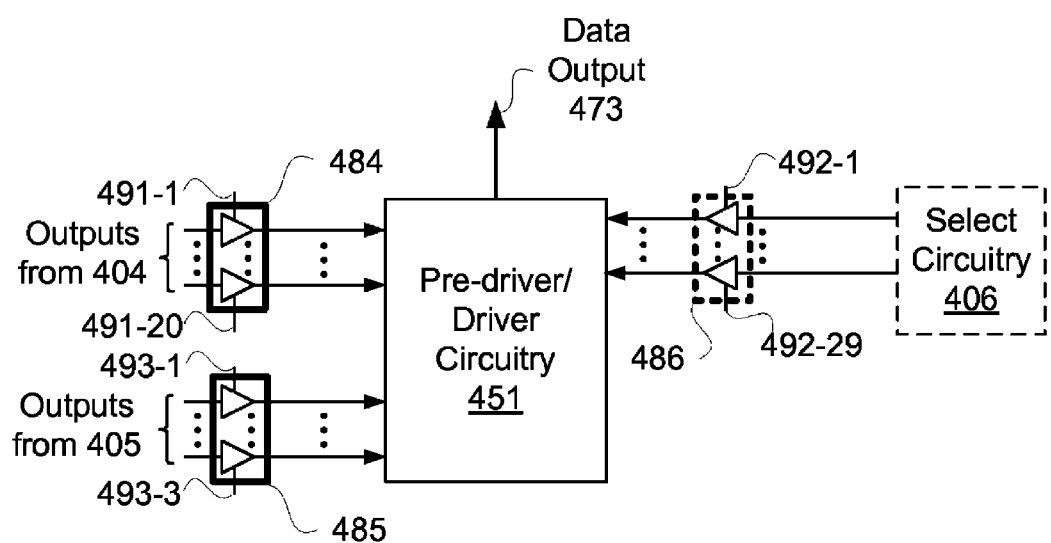
FIG. 4D is a block/circuit diagram depicting another exemplary embodiment for the driver system of FIGS. 4A through 4C.

FIG. 4D is a block/circuit diagram depicting another exemplary embodiment for driver system 400. In FIG. 4D, outputs of select circuitry 404 through 406 are respectively provided to sets of tri-stateable buffers 484 through 486. In this exemplary embodiment, tri-stateable buffers are illustratively depicted; however, any circuit that makes a unit provide no weighted contribution to signal level may be used.

Enable signals 491-1 through 491-20 are respectively provided to buffers of buffer set 484. Enable signals 492-1 through 492-20 are respectively provided to buffers of buffer set 486. Enable signals 493-1 through 493-20 are respectively provided to buffers of buffer set 485.

Enable signals 491 may be asserted to tri-state output of buffers of buffer set 484. Thus, to disable 0 to 20 outputs of select circuitry 404, 0 to 20 enable signals of enable signals 491 may be asserted. Such assertion corresponds to not using pre-cursor units as either pre-cursor units or cursor units. Rather, such unused or unassigned pre-cursor or cursor units are effectively used as High-Z units.

Enable signals 493 may be asserted to tri-state output of buffers of buffer set 485. Thus, to disable 0 to 31 outputs of select circuitry 405, 0 to 31 enable signals of enable signals 493 may be asserted. Such assertion corresponds to not using post-cursor units as either post-cursor units or cursor units. Rather, such unused or unassigned post-cursor or cursor units are effectively used as High-Z units.

Enable signals 492 may be asserted to tri-state output of buffers of buffer set 486. Thus, to disable 0 to 29 outputs of select circuitry 406, 0 to 29 enable signals of enable signals 492 may be asserted. Such assertion corresponds to not using cursor units as cursor units. Rather, such unused or unassigned cursor units are effectively used as High-Z units. It should be understood that this is a redundant operation when High-Z inputs are provided to 2-to 1 one multiplexers with cursor inputs. However, from this it should be understood that in another embodiment, select circuitry 406, buffers 486, and associated signals may be omitted, where multiplexer/tri-state buffer pairs of select circuits 404 and 505/buffers 484 and 485 may be used to assign pre-cursor, main cursor, post-cursor, and High-Z units.

However, for purposes of clarity and not limitation, the exemplary embodiment of FIGS. 4A and 4C is described below in additional detail. For the exemplary embodiment of a PCIe and 10Gbase-KR bi-modal driver system 400, CS signals 401-1 through 401-20 of CS set of signals 401 may be respectively provided as control select inputs to multiplexers 444-1 through 444-20 of select circuitry 404. Pre-cursor inputs 402-1 through 402-20 of parsed pre-cursor data 402 may be respectively input to multiplexers 444-1 through 444-20, and another input of multiplexers 444-1 through 444-20 may respectively be cursor data 403-1 through 403-20 of parsed cursor data 403. For both a PCIe mode and 10Gbase-KR mode, there are 20 pre-cursor/cursor pairs in this exemplary embodiment, and thus multiplexers 444-1 through 444-20 may all have active outputs in both PCIe and 10Gbase-KR modes.

Select circuitry 405, in this exemplary embodiment, includes multiplexers 445-1 through 445-31. Multiplexers 445-1 through 445-31 respectively receive as control select inputs CS signals 421-1 through 421-31 of CS set of signals 421. As data input, multiplexers 445-1 through 445-31 respectively receive post-cursor data 422-1 through 422-31 of parsed post-cursor data 422. As another data input, multiplexers 445-1 through 445-31 respectively receive cursor data 423-1 through 423-31 of parsed cursor data 423. Outputs of select circuitry 405, namely of multiplexers 445-1 through 445-31, are respectively provided to pre-driver/driver circuitry 451. For both a PCIe mode and 10Gbase-KR mode, there are 31 post-cursor/cursor pairs in this exemplary embodiment, and thus multiplexers 445-1 through 445-31 may all have active outputs in both PCIe and 10Gbase-KR modes.

Select circuitry 406 includes multiplexers 446-1 through 446-29. Multiplexers 446-1 through 446-29 respectively receive as control select inputs CS signals 411-1 through 411-29 of CS set of signals 411. As a data input, multiplexers 446-1 through 446-29 respectively receive cursor data 413-1 through 413-29 of parsed cursor data 413. As another data input, multiplexers 446-1 through 446-29 receive a logic state for causing a high impedance state, which is generally indicated as High-Z inputs 412-1 through 412-29. However, High-Z inputs 412-1 through 412-29 may be thought of as a single High-Z input signal 412 used multiple times. Outputs from select circuitry 406, namely from multiplexers 446-1 through 446-29, are provided to pre-driver/driver circuitry 451.

In a PCIe mode, there is no High-Z input or user selected input for multiplexers 446-1 through 446-29 of select circuitry 406. Accordingly, for a PCIe mode, select circuitry 406 may in an embodiment be disabled responsive to mode select signal 465 provided thereto. In another embodiment, mode select signal 465 is not provide to select circuitry 406; rather, mode select signal 465 in control select generation circuitry 460 is used such that CS 411 always selects cursor data 413 inside select circuitry 406.

In the exemplary embodiment for a 10Gbase-KR, any integer number from 0 through 29, inclusive, of multiplexers 446-1 through 446-29 may have an active or inactive output. It should be understood that selection of 0 cursor units is performed by selecting all High-Z 412 outputs from multiplexers 446.

Accordingly, pre-driver/driver circuitry 451 may be used to effectively drive signal levels for output or filter coefficients for providing weighted contributions based on outputs received from select circuits 404 through 406. Pre-driver/driver 451 may be used to provide data output 473, which such data output 473 may be provided as output. Accordingly, pre-driver/driver circuitry 451 may be used as a filter, such as a Finite Impulse Response ("FIR") filter for example.

It should be understood that each of the multiplexers of select circuits 404 through 406 may be a two data input multiplexer. It should be understood that by having two-to-one multiplexers high frequency operation is facilitated. In other words, three-to-one and larger ratio multiplexers conventionally have less capability to operate at higher frequencies. Furthermore, it should be understood that select circuitry 404 is configured to provide pre-cursor or main cursor outputs, as previously described with reference to FIGS. 2 and 3. Likewise, it should be understood that select circuitry 405 is configured to provide post-cursor or main cursor outputs, as previously described with reference to FIGS. 2 and 3. Furthermore, select circuitry 406 is configured to provide as between a high impedance state and main cursor outputs, as previously described with reference to FIG. 3.

It should further be understood that by adding optional output buffering, for example as described with reference to FIG. 4D, select circuitry 406 may be omitted. Furthermore, addition of such output buffering may not have an appreciable effect on speed of operation.

In the aforementioned description, it has been assumed that each set, such as pre-cursor units set 311, cursor units set 312, post-cursor units set 313, and High-Z units set 314, are implemented as either/or propositions to input select multiplexers. However, it should be understood that coefficients provided by pre-driver/driver 451 need not be so limited with respect to implementation of select circuitry. In other words, it should be understood that filter coefficients represent a value, and such value may be obtained by having drivers of pre-driver/driver circuitry 451 that are a binary progression as opposed to a linear progression of step one.

Figure 5:
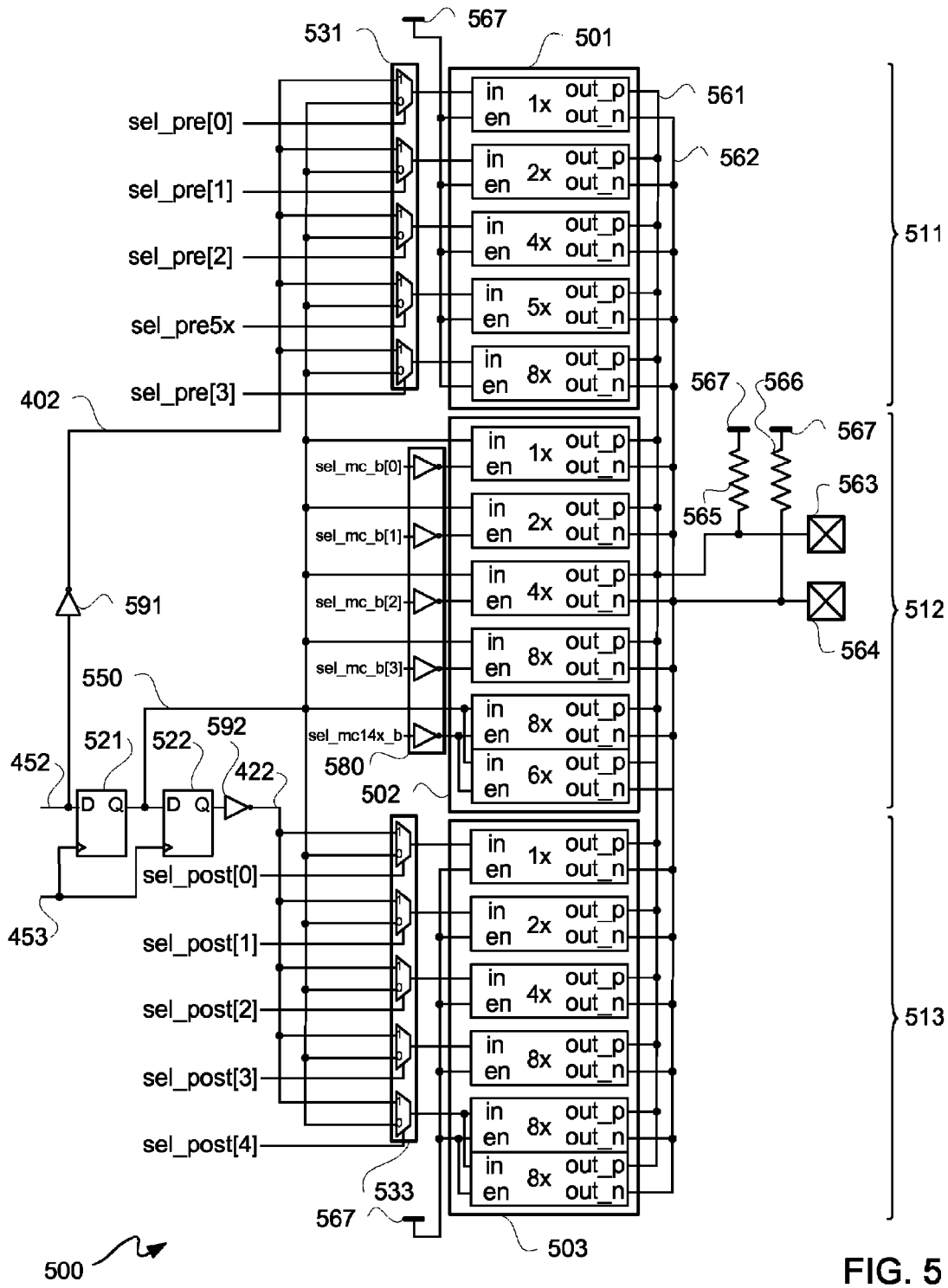
FIG. 5 is a block/circuit diagram depicting an exemplary embodiment of a differential driver system.

Along those lines, FIG. 5 is a block/circuit diagram depicting an exemplary embodiment of a differential driver system 500. Differential driver system 500 includes three sets of driver blocks 501 through 503. Driver blocks 501 through 503 are for scaling various inputs thereto as described below in additional detail for providing a weighted contribution for each of a pre-cursor symbol, a main symbol, and a post-cursor symbol for signal level, such as for transmission.

Differential driver system 500 is described for the exemplary embodiment of 20, 29, and 31 units of pre-cursor, main cursor, and post-cursor information, as previously described. However, it should be understood that other driver block combinations may be used, including other combinations to provide other weighted contributions.

Driver blocks 503 are a binary progression corresponding to a post-cursor weighted contribution for a PCIe mode and a 10Gbase-KR mode, which are the same in this respect. Likewise, driver blocks 501 and 502 include binary progressions for pre-cursor and main cursor weighted contributions, respectively, for both PCIe mode and 10Gbase-KR modes. However, driver blocks 501 and 502 further include drivers for providing other weighted contribution.

Driver blocks 501 correspond to a pre-cursor section 511, which pre-cursor section is capable of providing a weighted contribution from 0 to 20, inclusive, with a step of 1 in a PCIe mode and in a 10Gbase-KR mode. The non-binary weight of a 5× driver block is in addition to the binary progression of 1×, 2×, 4×, and 8× driver blocks of driver blocks 501 for providing the described range. Additionally, it should be appreciated that pre-cursor section 511 is configured to use unused pre-cursor units as main cursor units.

Driver blocks 502 correspond to a main cursor section 512. Main cursor section 512 is configured to have 29 cursor units contributing to a weighted contribution of a main symbol. Main cursor section 512 is configured to provide 0 to 29, inclusive, with a step of 1, main cursor units with a remainder of unused cursor units as High-Z units in a 10Gbase-KR mode. A combination of an 8× driver block and a 6× driver block of driver blocks 502 provide a 14× weight in addition to the binary progression of 1×, 2×, 4×, and 8× driver blocks of driver blocks 502 for providing the described range.

Driver blocks 503 correspond to a post-cursor section 513. Post-cursor section 513 is configured to provide 0 to 31, inclusive, with a step size of 1, post-cursor units in both a PCIe mode and 10Gbase-KR mode. Post-cursor section 513 is configured to apply unused post-cursor units as cursor units.

With this understanding of sets of driver blocks 501 through 503 as corresponding to cursor sections 511 through 513, differential driver system 500 is further described.

Data input 452 is provided to a data input port of flip-flop 521 and, after inversion by inverter 591, provided as pre-cursor data 402 data inputs to multiplexers 531. Inverter 591 has the effect of inverting the sign of the pre-cursor coefficient relative to the cursor coefficient. However, in another embodiment, inverter 591 may be omitted to have a pre-cursor coefficient with the same sign as the cursor coefficient. Still, in yet another embodiment, inverter 591 may be replaced with an XOR gate such that a user can select either same or different pre-cursor and main cursor signs. In this exemplary embodiment, multiplexers 531 are all two-to-one multiplexers. In this exemplary embodiment, there are five multiplexers 531 corresponding to five driver blocks of driver blocks 501.

Output of flip-flop 521 is provided as a data input to flip-flop 522 and as main cursor data 550 inputs to multiplexers 531 and 533. Additionally, output of flip-flop 521 is provided as main cursor data 550 inputs to driver blocks of driver blocks 502. Flip-flops 521 and 522 are clocked responsive to clock signal 453.

Output from flip-flop 522 is inverted by inverter 592, and output of inverter 592 is provided as post-cursor data 422. Inverter 592 has the effect of inverting the sign of the post-cursor coefficient relative to the cursor coefficient. However, in another embodiment, inverter 592 may be omitted to have a post-cursor coefficient with the same sign as the cursor coefficient. Still, in yet another embodiment, inverter 591 may be replaced with an XOR gate such that a user can select either same or different pre-cursor and main cursor signs. Post-cursor data 422 is provided as data inputs to multiplexers 533. In this exemplary embodiment, there are five two-to-one multiplexers 533.

Flip-flops 521 and 522, as well as inverters 591 and 592, may be implemented as part of parser 407 of FIG. 4B. Thus, main cursor data 550 may be main cursor data 403, 413, and 423 as respectively provided to driver blocks 501, 502, and 503.

It should be understood that select circuitry need not be limited to multiplexers. For example, select circuitry may be implemented with signals that enable or disable a driver. For example, with respect to main cursor section 512, select circuitry does not involve use of multiplexers, but rather a two-to-one selection is performed by enabling or disabling driver blocks of driver blocks 502 responsive to select main cursor bar ("sel_mc_b") signals. Thus, it should be understood that select circuitry may effectively implemented with any of a variety of circuits.

In this exemplary embodiment, control select signals sel_pre[0] through sel_pre[3] are provided as control select inputs to multiplexers of multiplexers 531 corresponding to a binary sequence, namely a 1×, 2×, 4×, and 8×, of drive strength of driver blocks of driver blocks 501. A multiplexer of multiplexers 531 corresponding to a 5× driver block receives a sel_pre5× control select signal. It should be understood that a 5× driver block of driver blocks 501 is to provide support for a range that is not a binary sequence, namely a power of two sequence. Outputs of multiplexers 531 are respectively provided to input ports of driver blocks of driver blocks 501. Each of the driver blocks of driver blocks 501 have their enable ports tied to a logic high or logic 1 state 567 so that they are in an active state. Thus, driver blocks 501 are always active for providing output during operation.

Control select signals sel_post[0] through sel_post[4] are respectively provided to multiplexers of multiplexers 533 corresponding to driver blocks 1× through 16×. More particularly, rather than a 16× diver block, two 8× driver blocks are used in this exemplary embodiment of driver blocks 503. Each of the driver blocks of blocks 503 have their enable ports tied to a logic high or logic 1 state 567, and thus are always active during operation. Outputs of multiplexers 533 are respectively provided to input ports of driver blocks of driver blocks 503, where the output of a highest order multiplexer of multiplexers 533 is provided to two input ports, namely of the two input ports associated 8× driver blocks, and both of those driver blocks have their enable ports tied to a logic high state. Because in both the PCIe and 10Gbase-KR modes post-cursors are a power of two sequence, namely from 0 to 31, inclusive, a binary progression sequence of drive strength for driver blocks 503 may be implemented to support both modes.

Accordingly, once the value of Z units for High-Z units 314 of FIG. 3 is determined and such number is set for High-Z units 314 for a high impedance set, remaining units, namely 29−Z units, are associated as cursor units. In a PCIe mode, there are no High-Z units 314, and accordingly Z is set to zero for a PCIe mode.

Select main cursor bar signals, namely sel_mc_b[0] through sel_mc_b[3] and sel_mc14×_b, may all be unasserted, namely logic high. Signals sel_mc_b[0] through sel_mc_b[3] and sel_mc14×_b may all be provided as inputs to respective inverters of inverters 580. Outputs of inverters 580 are respectively provided to enable ports of driver blocks 502

Input ports of driver blocks 502 are coupled to receive main cursor data 550. Signals sel_mc_b[0] through sel_mc_b[3] are respectively provided to corresponding inverters of inverters 580, and outputs of those inverters of inverters 580 are respectively provided to a binary progression, namely 1×, 2×, 4×, and 8×, of drivers blocks of driver blocks 502. However, to support a range that is not a power of two sequence, namely to support a maximum user setting of 29 for assigned cursor units, an additional drive strength of 14× may be used. In other words, sel_mc14×_b may be provided to enable ports of a 14× driver block of driver blocks 502.

In this exemplary embodiment, driver blocks 501 have a cumulative total drive strength of 20; driver blocks 502 have a cumulative total drive strength of 29; and driver blocks 503 have a cumulative total drive strength of 31. In this exemplary embodiment, each driver block of driver blocks 501 through 503 has a positive output and a negative output for differential signaling. All positive outputs of driver blocks 501 through 503 are coupled to output node 561, and all negative outputs of driver blocks 501 through 503 are coupled to output node 562. In the exemplary embodiment, output node 561 is connected to a positive side output pad 563, and output node 562 is coupled to a negative side output pad 564 for differential signaling. It should be understood that outputs from driver blocks of driver blocks 501 through 503 onto positive side output node 561 and negative side output node 562 are effectively summed by such output nodes to provide a weighted contribution for pre-cursor, main cursor, and post cursor symbols for communication via output pads 563 and 564, respectively.

Accordingly, conversion from coefficient numbers to a sum or sums of weighted contributions, via commonly coupled output nodes, is done with the driver blocks 501 through 503 to provide a differential FIR. Each weighted set of driver blocks pulls its contribution of current, and such contributions are summed and cause a voltage drop on termination resistors near out_p and out_n outputs.

For high-speed differential signaling for high-speed serial data, a source termination resistor 565 may be coupled at one end to output node 561 and at another end to a supply voltage 567, and another source termination resistor 566 may be coupled at one end to output node 562 and at another end to supply voltage 567. Resistors 565 and 566 may effectively be source termination resistors for a differential output signaling specification. Even though fixed resistors are illustratively depicted, it should be understood that resistors 565 and 566 may be implemented with variable resistors.

In an application, pre-driver/driver system 500 may be used as an output driver for driving data. In another implementation, pre-driver/driver system 500 may have its output, namely output nodes 561 and 562, directly coupled as an input to another stage, and source termination resistors may be moved to the output of such stage. More particularly, separate stages for positive and negative signals may be coupled to output nodes 561 and 562.

Figure 6:
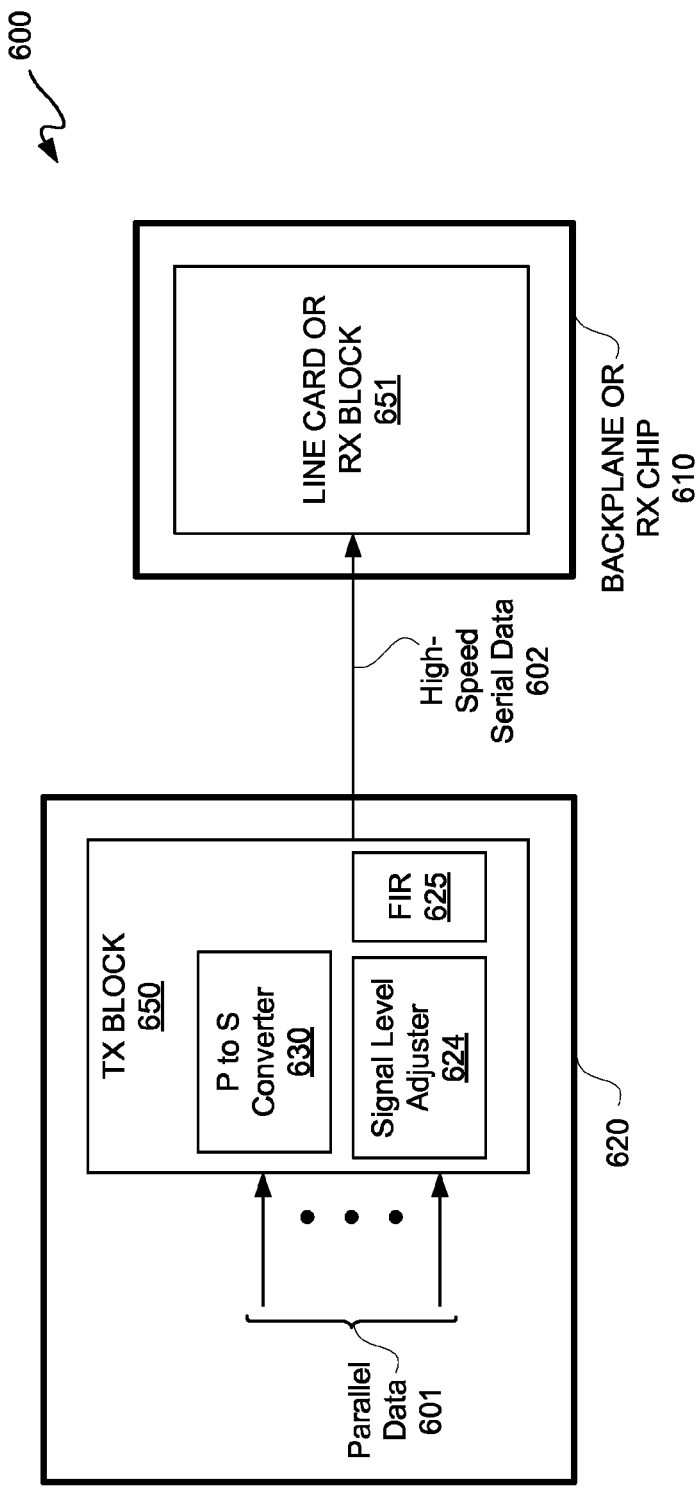
FIG. 6 is a block diagram depicting an exemplary embodiment of a communication system.

FIG. 6 is a block diagram depicting an exemplary embodiment of a communication system 600. An integrated circuit chip 620 may include a transmission block 650. Transmission block 650 may have a parallel-to-serial converter 630, a signal level adjuster 624, and FIR filter block 625. Parallel data 601 may be input to transmission block 650 for conversion to serial data by parallel-to-serial converter 630. Serial data from converter 630 may be provided to signal level adjuster 624. Signal level adjuster 624 may be implemented as described herein for bi-modal signal level adjustment, such as described with reference to system 400 of FIG. 4 or system 500 of FIG. 5 for example.

Output of signal level adjuster 624 may be input to FIR filter block 625, such as described with reference to system 400 of FIG. 4 or system 500 of FIG. 5 for example, for outputting high-speed serial data 602 from integrated circuit chip 620. By high-speed serial data 602, it should be understood to include serial transmission conforming at least to a third generation PCIe or 10Gbase-KR speed specification. High-speed serial data 602 may be provided to a backplane or receiver chip 610. More particularly, a backplane or receiver chip 610 may respectively include a line card or a receiver block 651 for receipt of high-speed serial data 602.

Figure 7:
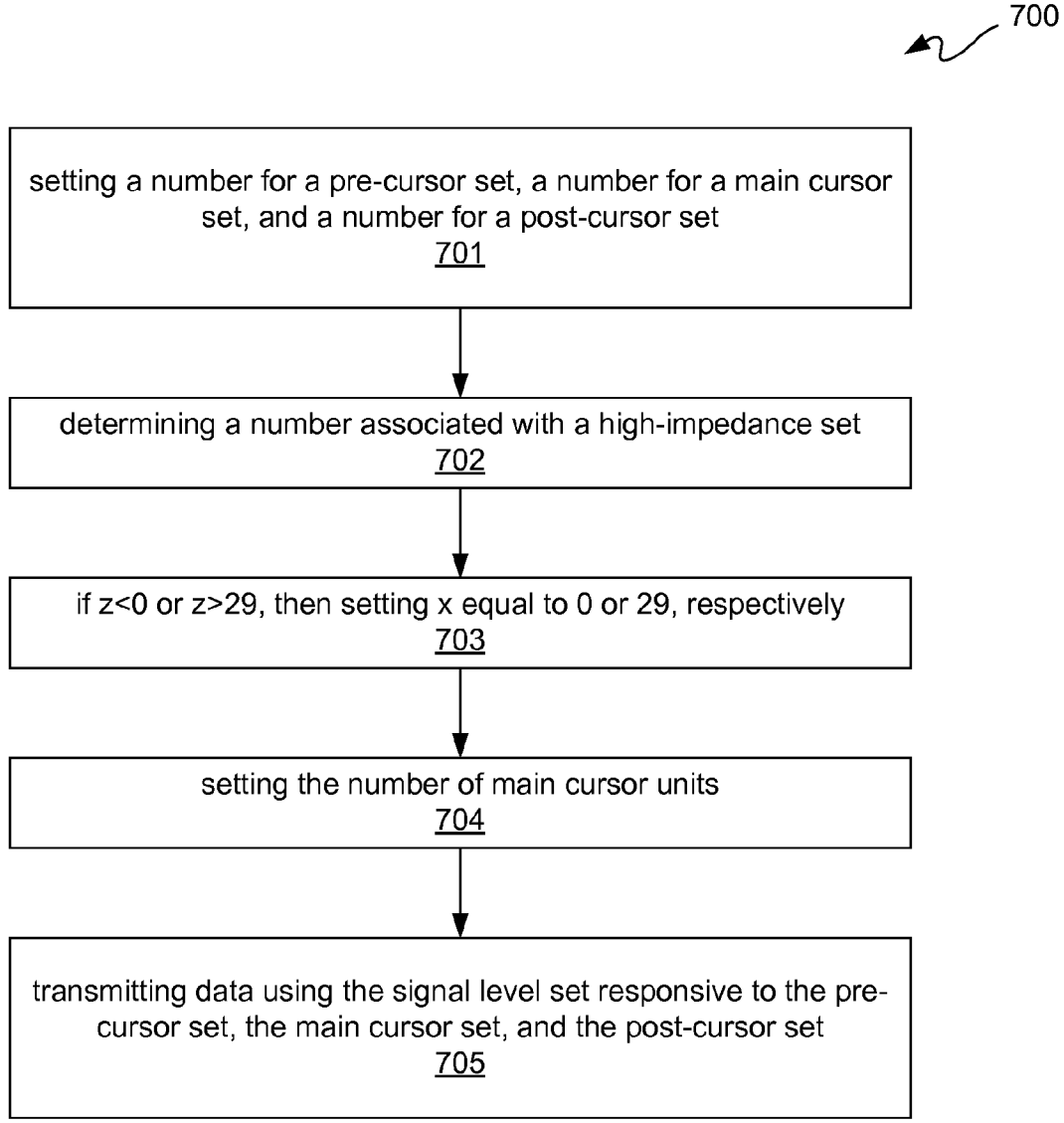
FIG. 7 is a flow diagram depicting an exemplary embodiment of a signal level control flow.

FIG. 7 is a flow diagram depicting an exemplary embodiment of a signal level control flow 700. At 701, a number for a pre-cursor set, a number for a main cursor set, and a number for a post-cursor set are all input or otherwise set responsive to user input. The number for the pre-cursor set, the number for the cursor set, and the number for the post-cursor set respectively correspond to a weighted contribution of each of a pre-cursor symbol, a main cursor symbol, and a post-cursor symbol. Such weighted contributions may be used for providing a signal level.

At 702, a number associated with a high impedance set is determined. The number associated with the high impedance set may be determined by subtracting the number for the pre-cursor set, the number for the main cursor, and the number for the post-cursor set from a total available amount of units. It should be understood that the high impedance set provides no weighted contribution to such signal level.

At 703, it is determined whether the number of high impedance units determined at 702 is less than zero. For purposes of clarity by way of example and not limitation, the number of high impedance units is denoted as the variable "z" in FIG. 7. If the number of high impedance units is determined to be less than zero, then the number of high impedance units is set equal to zero at 703.

Furthermore, at 703, it is determined whether the number of high impedance units determined at 702 is greater than the maximum number of high impedance units that corresponds to a constraint on the number of cursor units. Again, for the example of a 10Gbase-KR mode, the constraint on the number of cursor units corresponds to z being in the range of 0 to 29; however, other constraint numbers may be used. For purposes of clarity by way of example and not limitation, it shall be assumed that the Gbase-KR mode is used, and thus the constraint on the number of cursor units corresponds to z being in the range of 0 to 29. At 703, it is determined whether the number of high impedance units is greater than 29. If the number high impedance units is determined to be greater than 29, then the number of high impedance units is set equal to 29. More generally, it should be understood that if the number of high impedance units is determined to be greater than a constraint therefor, the number of high impedance units is set to equal the constraint on the number of high impedance units.

At 704, the number of main cursor units may be reset responsive to an outcome at 703, or if the number of high impedance units is determined to be equal to or greater than zero and less than or equal to 29, then the number of impedance units as determined at 702 may be used. At 704, the number of main cursor units is set equal to a total available number of units less the number A of pre-cursor units, the number C of post-cursor units and the number z of high impedance units obtained in 703.

In another embodiment, the constraint on the number of cursor units may be for a maximum number of cursor units, exclusive of any contribution from unused ones of pre-cursor units and post-cursor units. In such other embodiment, the number of cursor units, exclusive of any contributions from unused pre/post-cursor units, may be set as 29–z for example. Furthermore, the total number of cursor units may thus be based on all sources therefor, namely unused pre-cursor units assigned as main cursor units, unused post-cursor units assigned as main cursor units, and allocated main cursor units. In such other embodiment, unused pre/post-cursor units may be assigned by operations independent of operations at 702 and 703, such as part of setting pre/post-cursor units at 701.

At 705, data is transmitted using a signal level set responsive to the pre-cursor set, the main cursor set, and the post-cursor set. It should be understood that these settings may be for coefficients of a filter, such as an FIR filter.

Figure 8:
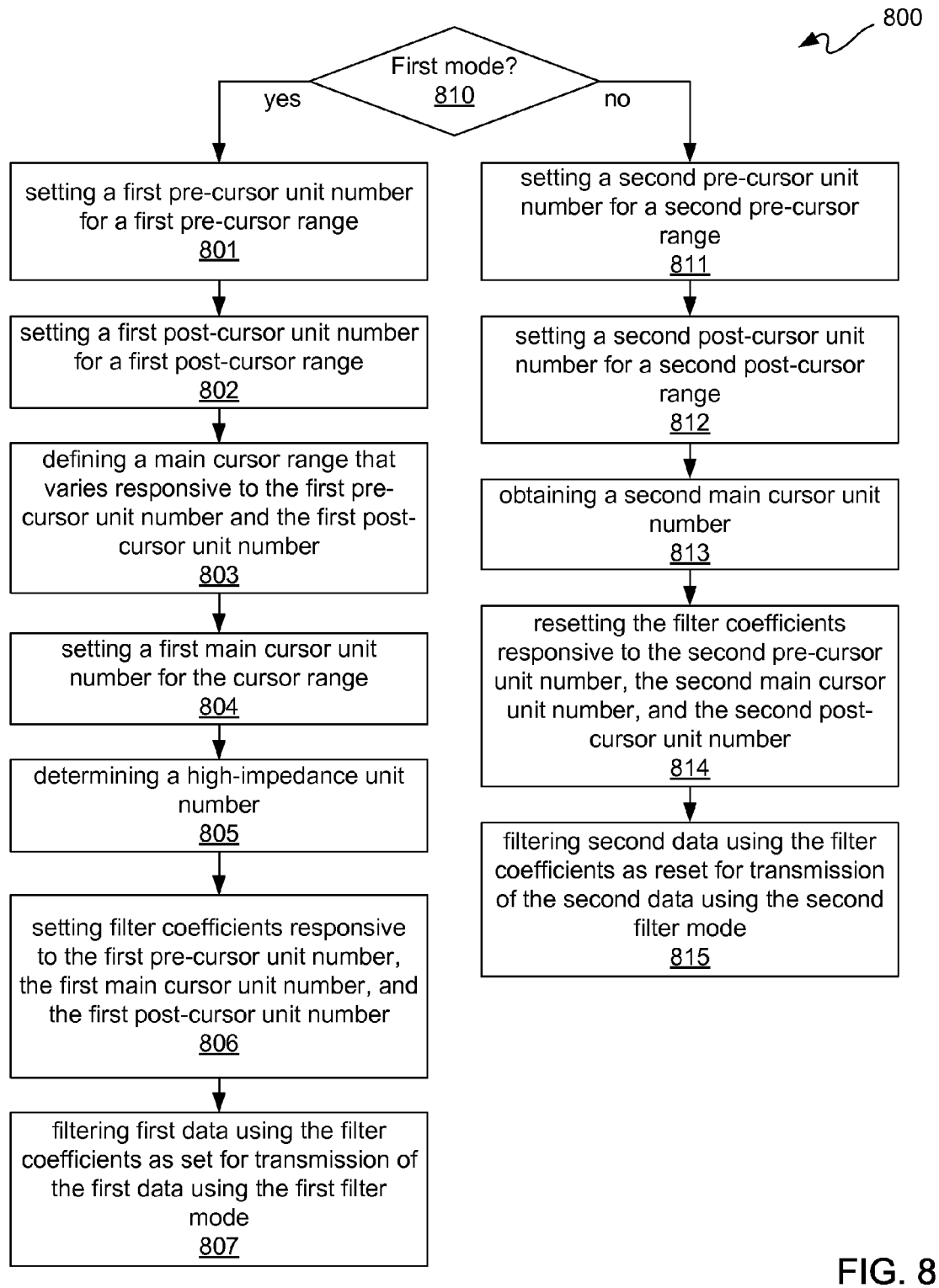
FIG. 8 is a flow diagram depicting an exemplary embodiment of a bi-modal filtering flow.

FIG. 8 is a flow diagram depicting an exemplary embodiment of a bi-modal filtering flow 800. At 810, it is determined which mode is selected as between a first mode and a second mode. If a first mode is selected, which in this exemplary embodiment is assumed to be a 10Gbase-KR mode for purposes of clarity by way of example and not limitation, then at 801 a first pre-cursor unit number for a first pre-cursor range is set. At 802, a first post-cursor unit number for a first post-cursor range is set. At 803, a main cursor range is defined that varies responsive to the first pre-cursor unit number set at 801 and the first post-cursor unit number set at 803.

At 804, a first main cursor unit number is set for the cursor range set at 803. The first main cursor unit number, as well as the first post-cursor unit number and the first pre-cursor unit number, such as set at 802 and 801, respectively, may all be set by a user. For purposes of clarity by way of example and not limitation, if the first mode is a 10Gbase-KR mode, ranges as previously described herein may be used for the aforementioned settings. However, it should be understood that a user may inadvertently set the first cursor unit number outside of a range or constraint.

To ensure that the first main cursor unit number is set properly, at 805 a high impedance unit number is determined. Such high impedance unit number may be determined as previously described herein. At 806, filter coefficients are set responsive to the pre-cursor unit number, the main cursor unit number, and first cursor unit number. Again, the high impedance unit number, namely the high impedance units, do not contribute to weighted contribution for purposes of filter coefficients. At 807, first data may be filtered using the filter coefficients as set at 806 for transmission of the first data using the first mode.

If at 810 a second mode is selected, then at 811 a second pre-cursor unit number for a second pre-cursor range is set. For purposes of clarity by way of example and not limitation, it shall be assumed that the second mode is a PCIe mode.

At 812, a second post-cursor unit number for a second post-cursor range is set. At 813, a second main cursor unit number is obtained. At 814, the filter coefficients are set or reset for the example of having selected a first mode at 810 prior to selecting a second mode for the example exemplary embodiment of FIG. 8. Such setting or resetting is responsive to the second pre-cursor unit number, the second main cursor unit number, and the second post-cursor number. At 815, second data is filtered using the filter coefficients as set or reset at 814 for transmission of the second data using the second mode.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A method for control of signal level, comprising:
   setting a number for a pre-cursor set, a number for a cursor set, and a number for a post-cursor set corresponding to a weighted contribution of a pre-cursor symbol, a weighted contribution of a cursor symbol, and a weighted contribution of a post-cursor symbol, respectively, for the signal level;
   determining a number associated with a high-impedance set;
   wherein the number associated with the high-impedance set is determined by subtracting the number for the pre-cursor set, the number for the cursor set, and the number for the post-cursor set from a total available amount of units;
   wherein the high-impedance set provides no weighted contribution to the signal level; and
   transmitting data using the signal level set responsive to the pre-cursor set, the cursor set, and the post-cursor set.

2. The method according to claim 1, wherein the pre-cursor set, the cursor set, the post-cursor set, and the high-impedance set include a number of pre-cursor units, a number of cursor units, a number of post-cursor units, and a number of high-impedance units, respectively.

3. The method according to claim 2, further comprising:
   determining whether the number of high-impedance units is less than zero; and
   if the number of high-impedance units is determined to be less than zero, setting the number of high-impedance units equal to zero.

4. The method according to claim 3, further comprising:
   determining whether the number of high-impedance units is greater than a maximum number of high-impedance units corresponding to a constraint on the number of cursor units; and
   if the number of high-impedance units is determined to be greater than the maximum number of high-impedance units, setting the number of high-impedance units equal to the maximum number of high-impedance units.

5. The method according to claim 4, wherein the constraint on the number of cursor units is for a maximum number of cursor units exclusive of any contribution from unused ones of pre-cursor units and post-cursor units.

6. The method according to claim 5, further comprising:
   subtracting the number for high-impedance units from the constraint on the number for cursor units to obtain a remainder; and
   assigning the remainder as the number of cursor units exclusive of any contribution from the unused ones of the pre-cursor units or the post-cursor units.

7. The method according to claim 6, further comprising:
   having a constraint on the number of pre-cursor units which is a maximum number of the pre-cursor units; and
   having a constraint on the number of post-cursor units which is a maximum number of the post-cursor units.

8. A method for bi-modal operation, comprising:
   selecting as between a first mode and a second mode;
   responsive to selection of the first mode,
      setting a first pre-cursor unit number for a pre-cursor range;
      setting a first post-cursor unit number for a post-cursor range;
      defining a cursor range that varies responsive to the first pre-cursor unit number and the first post-cursor unit number;
      setting a first cursor unit number for the cursor range; and
      determining a high-impedance unit number;
      wherein the high-impedance unit number is determined by subtracting the first pre-cursor unit number, the first cursor unit number, and the first post-cursor unit number from a total available amount of units.

9. The method according to claim 8, wherein the first mode is a first filter mode, the method further comprising in the first filter mode:
   setting filter coefficients responsive to the first pre-cursor unit number, the first cursor unit number, and the first post-cursor unit number; and
   filtering first data using the filter coefficients as set for transmission of the first data using the first filter mode.

10. The method according to claim 9, wherein the second mode is a second filter mode, the method further comprising in the second filter mode:
   setting a second pre-cursor unit number for the pre-cursor range;
   setting a second post-cursor unit number for the post-cursor range;
   determining a second cursor unit number;

wherein the second cursor unit number is determined by subtracting the second pre-cursor unit number and the second post-cursor unit number from the total available amount of units;

resetting the filter coefficients responsive to the second pre-cursor unit number, the second cursor unit number, and the second post-cursor unit number; and filtering second data using the filter coefficients as reset for transmission of the second data using the second filter mode.

11. The method according to claim 10, wherein in at least one mode of the first filter mode and the second filter mode, pre-cursor units not counted as part of the first pre-cursor unit number or the second pre-cursor unit number, respectively, are used as first additional cursor units; and post-cursor units not counted as part of the first post-cursor unit number or the second post-cursor unit number, respectively, are used as second additional cursor units.

12. The method according to claim 9, wherein for the first filter mode:

a maximum value for the cursor range is determined by subtracting the first number of pre-cursor units and the first number of post-cursor units from the total available amount of units; and a minimum value for the cursor range is determined by subtracting the first number of pre-cursor units and the first number of post-cursor units from a total available amount of pre-cursor and post-cursor units.

13. The method according to claim 9, further comprising for the first filter mode:

determining if the high-impedance unit number is less than zero; and if the high-impedance unit number is less than zero, setting the high-impedance unit number to zero.

14. The method according to claim 13, further comprising for the first filter mode:

determining whether the high-impedance unit number is greater than the maximum number of high impedance units corresponding to a constraint on number of cursor units; and if the high-impedance unit number is determined to be greater than the maximum number of high impedance units, setting the high-impedance unit number equal to the maximum number of high impedance units.

* * * * *